J. M. BROWN.
CHAIN COUPLING.
APPLICATION FILED NOV. 6, 1909.

975,323.

Patented Nov. 8, 1910.

Witnesses

Inventor
John M. Brown.

UNITED STATES PATENT OFFICE.

JOHN M. BROWN, OF JERSEY CITY HEIGHTS, NEW JERSEY.

CHAIN-COUPLING.

975,323.  Specification of Letters Patent.  Patented Nov. 8, 1910.

Application filed November 6, 1909. Serial No. 526,644.

*To all whom it may concern:*

Be it known that I, JOHN M. BROWN, a citizen of the United States, residing at 10 Lincoln street, Jersey City Heights, in the county of Hudson and State of New Jersey, have invented certain new and useful Improvements in Chain-Couplings, of which the following is a specification, reference being had therein to the accompanying drawing.

This invention relates to couplings for chains and the like, and the principal object of the same is to provide a coupling the members of which may be readily separated or assembled when necessary or desirable and in which the maximum of strength is obtained.

In carrying out the object of the invention generally stated above, it is contemplated employing two members, hereinafter referred to as a hook member and a link member, the hook having a side opening and the link having a flat and widened side portion which is provided with a guideway to facilitate the passage of the open side of the hook thereover.

It will be understood, of course, that in the practical application of the invention, the essential features thereof are necessarily susceptible of changes in details and structural arrangements, one preferred and simple embodiment of which is shown in the accompanying drawing, wherein—

Figure 1:
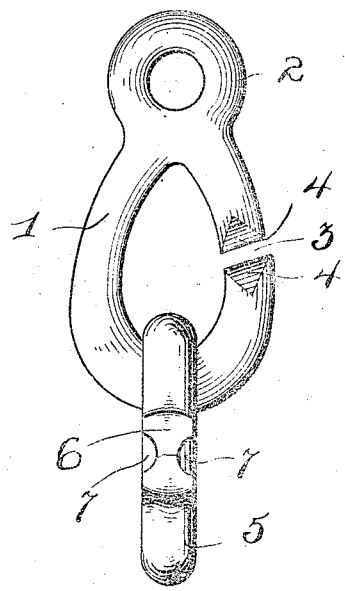
Figure 2:
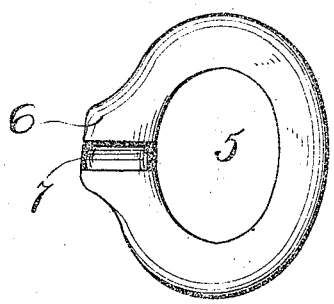
Figure 3:
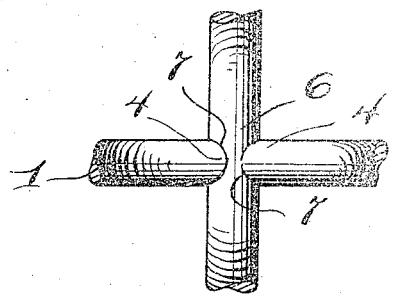

Figure 1 is a view in elevation of the hook and link assembled. Fig. 2 is a detail view of the hook. Fig. 3 is a fragmentary detail view of the hook and link, the hook being shown passing through the guideway of the link.

Referring to said drawings by numerals, 1 designates a hook which is provided at one end with an eye 2 by means of which it may be attached to a support or connector, not shown. The body portion of the hook is substantially in the shape of an open link, one side thereof being provided with a transverse slot 3, the ends 4 of the side terminating at said slot 3 being tapered and rounded.

The link 5 has a portion of one side widened and outwardly projected as indicated at 6, the said widened portion being substantially flat and the opposite surfaces thereof being provided with a rounded bottom grooved guideway 7. This enlarged portion is formed by upsetting the material so that there is an increased amount of metal adjacent the grooves. As will be observed by reference to Figs. 2 and 3, the combined depth of the two grooves 7 is substantially equal to one-half the thickness of the material of the link, but this apparent weakening of the link is offset by making the widened portion 6 of the link substantially twice the width as the side of the link. It will, therefore, be seen that an efficient guideway is provided for the tapering ends 4 of the hook without impairing the strength of the link.

As will be obvious the contour of the grooves 7 is the same as the ends 4 so that said ends may be readily passed through said grooves when the hook and link are held in the relative positions shown in Fig. 3.

The improved coupling may be used for a large variety of purposes and the size of the members may be varied in accordance with the use to which the invention is to be put. For example, as shown, the improved coupling may be used in connection with chains for personal wear, or in connection with hoisting gears, whiffle trees, or plow shackles. It will also be understood that if desired the eye at the end of the hook member may be omitted. In this connection, it is to be understood that the term "hook member" herein employed is used in the broadest sense and is intended to cover a link-shaped member having a transverse opening or slot formed through its side to facilitate the engagement of said member with a link.

What I claim as my invention is:—

A coupling comprising a link member having an enlarged solid portion projecting from one side of the link body, said enlarged portion being provided with oppositely disposed grooves, the cross sectional area through the bottom of the grooves being equal to the cross sectional area through the non-enlarged body portion of the link, and a hook member having a transversely slotted side, the sides of the slot being tapered and adapted to pass through said grooves.

In testimony whereof I hereunto affix my signature in presence of two witnesses.

JOHN M. BROWN.

Witnesses:
JOHN TORRANCE,
H. A. BUTLER.